US008373554B2

(12) United States Patent
Cai et al.

(10) Patent No.: US 8,373,554 B2
(45) Date of Patent: Feb. 12, 2013

(54) NETWORK-BASED IDENTIFICATION OF UNINSURED VEHICLES

(75) Inventors: Yigang Cai, Naperville, IL (US); Ranjan Sharma, New Albany, OH (US); Shengqiang Wang, Cary, NC (US)

(73) Assignee: Alcatel Lucent, Paris (FR)

( * ) Notice: Subject to any disclaimer, the term of this patent is extended or adjusted under 35 U.S.C. 154(b) by 698 days.

(21) Appl. No.: 12/556,508

(22) Filed: Sep. 9, 2009

(65) Prior Publication Data

US 2011/0057789 A1    Mar. 10, 2011

(51) Int. Cl.
*G08B 1/08* (2006.01)
(52) U.S. Cl. ........... 340/539.1; 340/505; 340/825.49; 340/825.69; 340/825.72; 705/3; 705/4
(58) Field of Classification Search ........ 340/539.2, 340/539.1, 539.13, 539.17, 825.49, 825.69, 340/426.19, 505, 825.72; 455/456.1, 466; 705/3, 4, 14, 35
See application file for complete search history.

(56) References Cited

U.S. PATENT DOCUMENTS

| | | | | |
|---|---|---|---|---|
| 5,963,129 A | * | 10/1999 | Warner | 340/468 |
| 2005/0203780 A1 | * | 9/2005 | Lott | 705/4 |
| 2005/0283388 A1 | * | 12/2005 | Eberwine et al. | 705/4 |
| 2007/0008179 A1 | | 1/2007 | Hedley et al. | |
| 2008/0119212 A1 | | 5/2008 | Himmelstein | |

* cited by examiner

*Primary Examiner* — Hung T. Nguyen
(74) *Attorney, Agent, or Firm* — Duft Bornsen & Fishman LLP

(57) ABSTRACT

Systems and methods are disclosed that detect uninsured vehicles. An insurance monitoring system described herein receives a message over a mobile network from a mobile device embedded in a vehicle, where the message from the mobile device includes a vehicle identification for the vehicle. The insurance monitoring system queries an insurance database based on the vehicle identification to determine whether the vehicle is uninsured. If the vehicle is uninsured, then the insurance monitoring system sends a notification message to a law enforcement entity.

20 Claims, 6 Drawing Sheets

NETWORK-BASED IDENTIFICATION OF UNINSURED VEHICLES

BACKGROUND

1. Field of the Invention

The invention is related to the field of communications and, in particular, to identifying vehicles that are operating without insurance.

2. Statement of the Problem

People driving vehicles on highways and other roadways without proper insurance has long been a problem in the United States and elsewhere. According to the Insurance Research Council, the estimated number of uninsured vehicles can reach 25% in some states. To compensate for those that operate vehicles without insurance, nearly all states have allowed insurance companies to offer Uninsured/Underinsured (UM/UIM) coverage. UM/UIM insurance provides coverage if an at-fault party either does not have insurance, or does not have enough insurance. The average insurance premium for UM/UIM insurance costs about $120 per commercial vehicle and $40 per personal vehicle annually. If uninsured vehicles were eliminated from the roads, UM/UIM insurance would no longer be needed. And, as the number of uninsured vehicles increases on the roads, the cost of UM/UIM insurance premiums will keep increasing.

To combat the use of uninsured vehicles, police officers ask for proof of insurance during routine stops. Also, the police officers may query a centralized database, such as a national Motor Insurance Database (MID), with a license plate number to check if a vehicle is insured or not. Unfortunately, this approach is labor-intensive and costly. Also, the police officers are only able to monitor a limited number of vehicles, and thus can only get a limited number of uninsured vehicles off of the road.

SUMMARY

Embodiments described herein identify uninsured vehicles by communicating with a mobile device that is embedded in the vehicle. A network-based system receives a signal over a mobile network (e.g., cellular network) from the mobile device that is embedded in the vehicle. The system then determines whether the vehicle has insurance, and if not, the system notifies a law enforcement entity. The network-based system advantageously assists the police in identifying uninsured vehicles, and removing the uninsured vehicles from the road.

One embodiment comprises an insurance monitoring system that communicates with a mobile network, such as a cellular network. The insurance monitoring system includes a network interface operable to receive a message over the mobile network from a mobile device embedded in a vehicle. The message from the mobile device includes a vehicle identification for the vehicle, such as a VIN, a license plate number, etc. The insurance monitoring system further includes a control system operable to query an insurance database based on the vehicle identification to determine whether the vehicle is uninsured. If the vehicle is uninsured, then the control system is further operable to send a notification message to a law enforcement entity.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
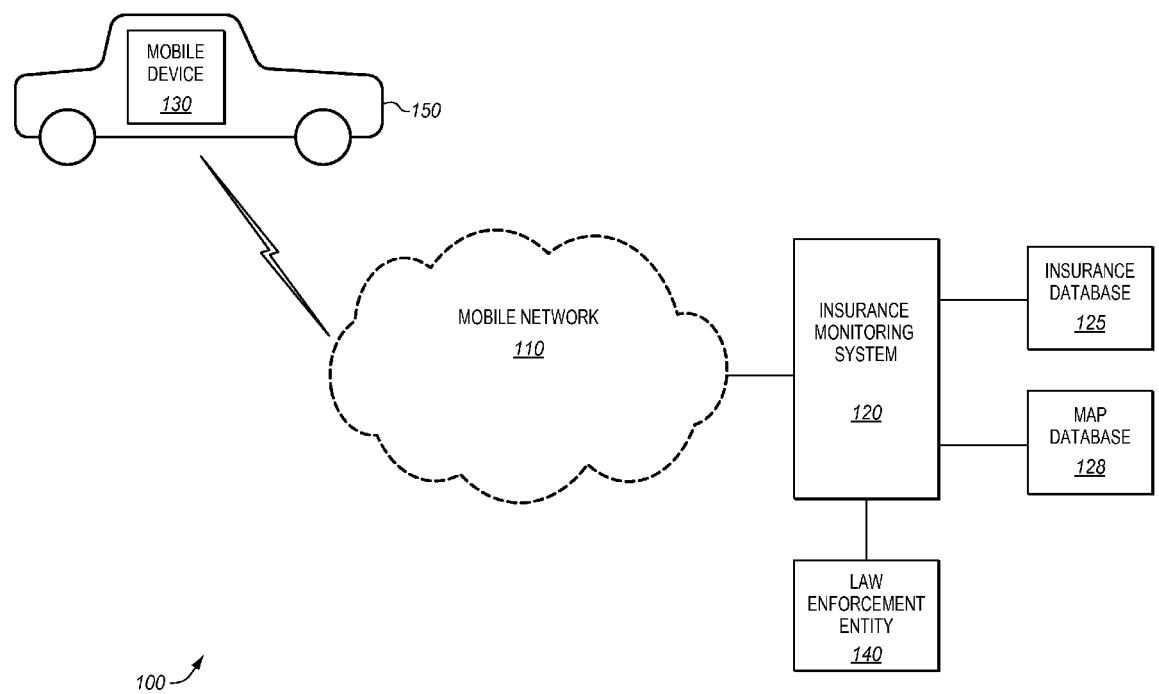
FIG. 1 illustrates a communication network in an exemplary embodiment.

FIG. 1 illustrates a communication network 100 in an exemplary embodiment. Communication network 100 includes a mobile network 110, an insurance monitoring system 120, an insurance database 125, and a map database 128. Mobile network 110 comprises any network that provides communications to mobile devices via wireless signals. An example of mobile network 110 includes a cellular network, such as a CDMA network or a GSM network. In this embodiment, mobile network 110 provides mobile communications to mobile device 130.

Mobile device 130 comprises any device operable to communicate via wireless signals, such as a mobile or cellular phone. Mobile device 130 is embedded or integrated within vehicle 150. For example, vehicle 150 may be equipped with a transceiver and a SIM card (referred to collectively as a mobile device) that are able to communicate with mobile network 110. Vehicles that are configured for OnStar service are one example of a vehicle equipped with a mobile device, such as mobile device 130. Mobile device 130 is programmed with a vehicle identification for vehicle 150, such as a VIN, a license plate number, etc.

Insurance monitoring system 120 comprises any system, server, or application operable to identify vehicles that are uninsured. The term "uninsured" means that there is no insurance on the vehicle or that there is not enough insurance on the vehicle. Insurance monitoring system 120 may be a server that is external to mobile network 110 and is operated by an independent entity that searches for uninsured vehicles, such as an insurance company, a governmental agency, etc. Alternatively, insurance monitoring system 120 may be a server implemented in mobile network 110 by the service provider to provide an insurance monitoring service.

Insurance database 125 comprises any server or data structure operable to store insurance policy information for vehicles. Insurance database 125 may comprise a centralized database that receives insurance policy information for each insurance company. One example of such a database is a Motor Insurance Database (MID) that is implemented in the UK. Insurance database 125 may also comprise a regional database that is populated by a single insurance company.

Map database 128 comprises any server or data structure operable to provide maps or a map service. For example, given a particular location (e.g., latitude/longitude), map database 128 may provide a map of a geographic area proximate to the location. Although shown as separate, map database 128 may be integrated within insurance monitoring system 120.

Figure 2:
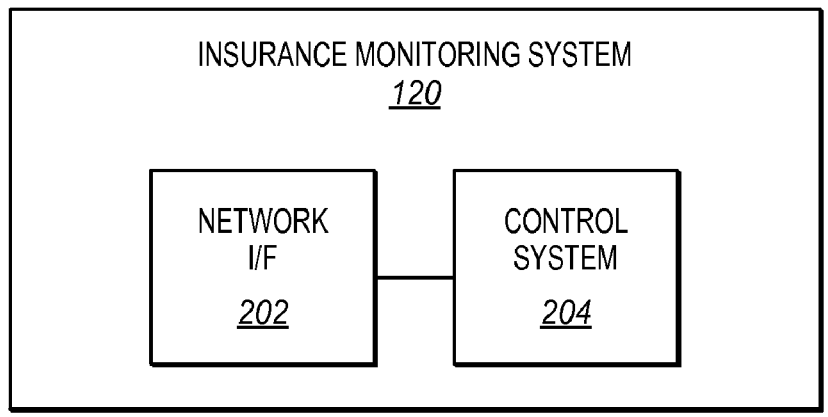
FIG. 2 illustrates an insurance monitoring system in an exemplary embodiment.

FIG. 2 illustrates insurance monitoring system 120 in an exemplary embodiment. In this embodiment, insurance monitoring system 120 includes a network interface 202 and a control system 204. Network interface 202 comprises any device, component, or system configured to exchange messages with mobile network 110. The messages exchanged may comprise Lightweight Directory Access Protocol (LDAP) messages, Message Application Part (MAP) messages, ANSI-41 messages, Session Initiation Protocol (SIP) messages, etc. Control system 204 comprises any device, component, or system configured to identify uninsured vehicles by communicating with mobile network 110.

When in operation, mobile device 130 sends a message to insurance monitoring system 120 that includes the vehicle identification for vehicle 150. Mobile device 130 may send the message responsive to the engine in vehicle 150 starting, responsive to vehicle 150 moving, etc. Other vehicles not shown may also include a mobile device that sends similar messages to insurance monitoring system 120. The following illustrates an exemplary operation of insurance monitoring system 120 to identify uninsured vehicles.

Figure 3:
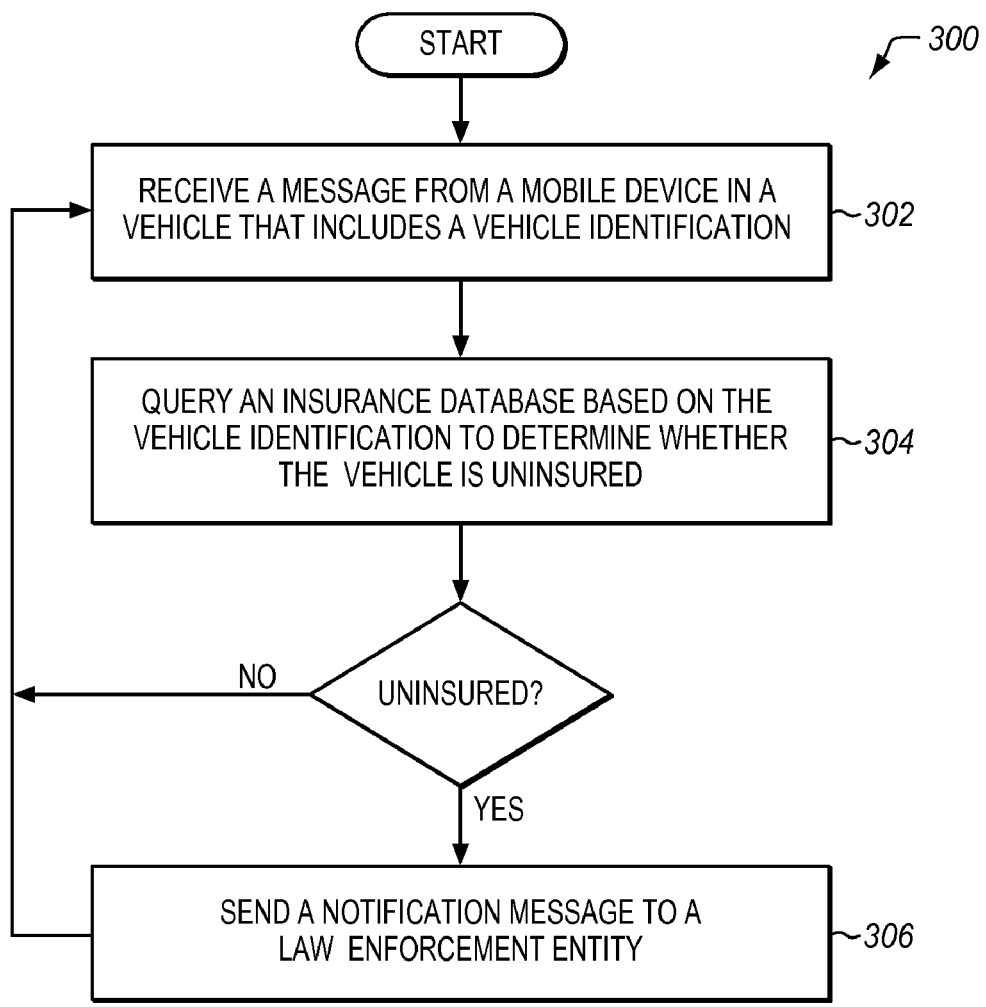
FIG. 3 is a flow chart illustrating a method of identifying uninsured vehicles in an exemplary embodiment.

FIG. 3 is a flow chart illustrating a method 300 of identifying uninsured vehicles in an exemplary embodiment. The steps of method 300 will be described with reference to communication network 100 in FIG. 1 and insurance monitoring system 120 in FIG. 2, but those skilled in the art will appreciate that method 300 may be performed in other networks and systems. Also, the steps of the flow charts provided herein are not all inclusive and other steps, not shown, may be included. Further, the steps may be performed in an alternative order.

In step 302, network interface 202 receives the message over mobile network 110 from mobile device 130. In step 304, control system 204 queries insurance database 125 based on the vehicle identification to determine whether vehicle 150 is uninsured. If the determination is that vehicle 150 is uninsured, then control system 204 sends a notification message to law enforcement entity 140 indicating that vehicle 150 is uninsured. Control system 204 may send the notification message to law enforcement entity 140 in a Short Message Service (SMS) message, a Multimedia Message Service (MMS) message, an email message, an Instant Message (IM), or some other message requested by law enforcement entity 140. Law enforcement entity 140 in this embodiment may comprise a police department, a sheriffs department, etc.

The notification message may include the vehicle identification, a description of the vehicle, such as year, color, make, and model, owner information, or any other pertinent information. The notification message may also include a present location of vehicle 150, as is illustrated in FIG. 4.

Figure 4:
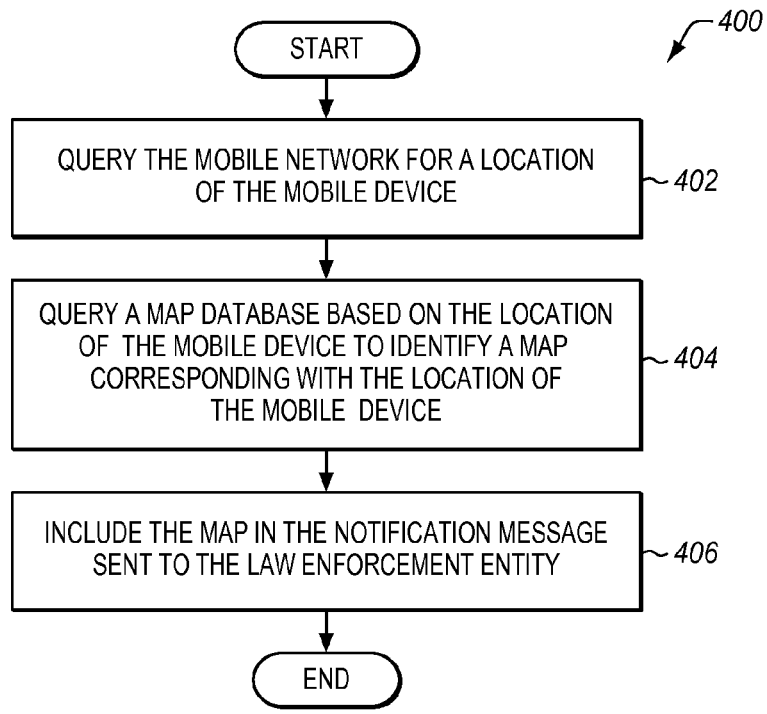
FIG. 4 is a flow chart illustrating a method of identifying a map of the present location of a mobile device in an exemplary embodiment.

FIG. 4 is a flow chart illustrating a method 400 of identifying a map of the present location of mobile device 130 in an exemplary embodiment. The steps of method 400 will be described with reference to communication network 100 in FIG. 1 and insurance monitoring system 120 in FIG. 2, but those skilled in the art will appreciate that method 400 may be performed in other networks and systems.

In step 402, control system 204 queries mobile network 110 (through network interface 202) for a location of mobile device 130. Mobile network 110 may include a variety of functionalities for determining the present location of a mobile device. For example, a GSM/UMTS network may include a location server referred to as a Gateway Mobile Location Center (GMLC) that is able to determine the present location of mobile devices in its network. In another example, a CDMA network may include a location server referred to as a Mobile Positioning Center (MPC) that is able to determine the present location of mobile devices in its network.

In response to the query, mobile network 110 identifies the present location of mobile device 130, and sends a response to control system 204 (through network interface 202) indicating the present location of mobile device 130. The present location may be a latitude/longitude or some other location information.

In step 404, control system 204 queries map database 128 based on the location of mobile device 130 to identify a map corresponding with the location of mobile device 130. Because mobile device 130 is embedded within vehicle 150, the map corresponding with the location of mobile device 130 indicates the location of vehicle 150. In step 406, control system 204 includes the map in the notification message sent to law enforcement entity 140. Law enforcement entity 140 thus has a description of vehicle 150 and a present location of vehicle 150. This gives law enforcement entity 140 a good opportunity to locate vehicle 150 and take the appropriate action.

In yet another embodiment, insurance monitoring system 120 may send the notification message to law enforcement entity 140 if vehicle 150 is identified as being operated on a public roadway. If vehicle 150 is parked at the home of its owner and is not driven on public roadways, then it may be legally uninsured. However, if vehicle 150 is operating away from the home of its owner, then there is a high likelihood that vehicle 150 is being operated on public roadways without insurance in an illegal manner.

Figure 5:
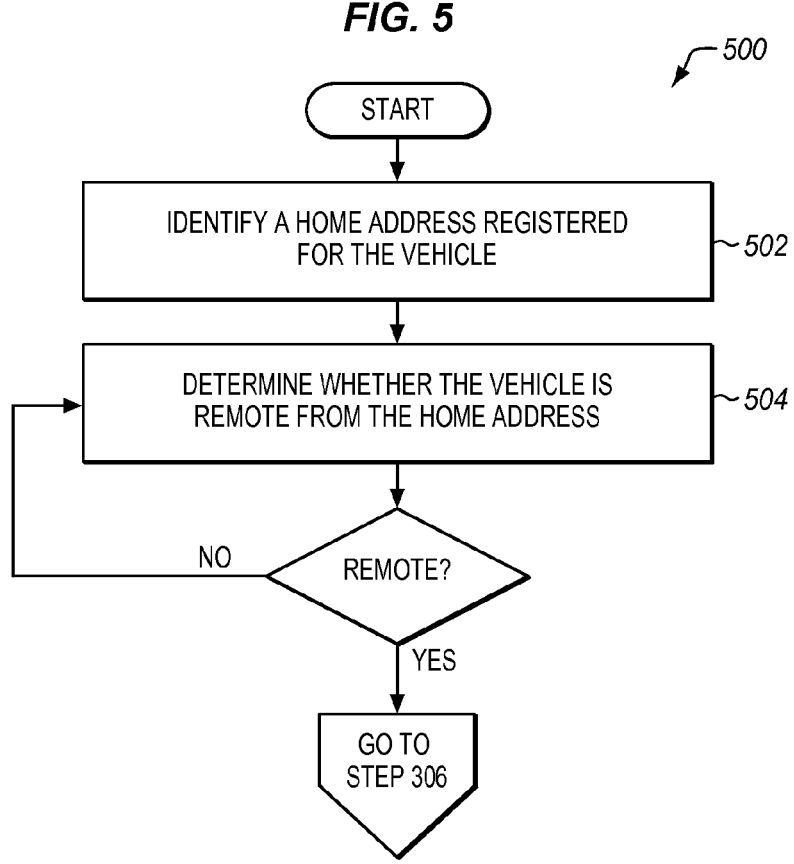
FIG. 5 is a flow chart illustrating a method of identifying if a vehicle is being operated on public roadways in an exemplary embodiment.

FIG. 5 is a flow chart illustrating a method 500 of identifying if vehicle 150 is being operated on public roadways in an exemplary embodiment. The steps of method 500 will be described with reference to communication network 100 in FIG. 1 and insurance monitoring system 120 in FIG. 2, but those skilled in the art will appreciate that method 500 may be performed in other networks and systems.

In step 502, control system 204 identifies a home address registered for vehicle 150. To identify the home address, control system 204 may query insurance database 125 or another database not shown. In step 504, control system 204 determines whether vehicle 150 is remote from the home address, and is being operated on public roadways. One method for determining whether vehicle 150 is remote from the home address is illustrated in FIG. 6 (method 600).

Figure 6:
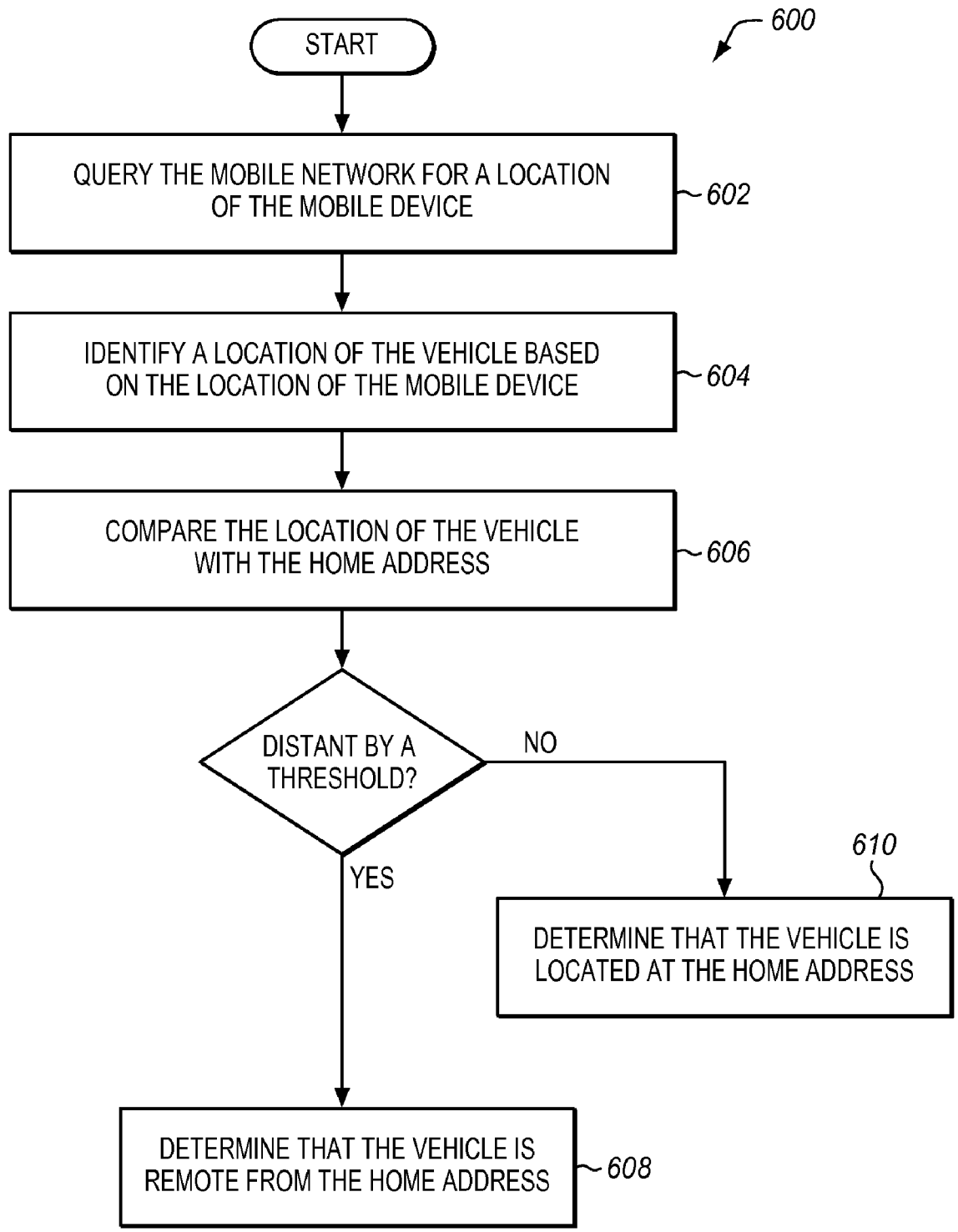
FIG. 6 is a flow chart illustrating a method of determining whether a vehicle is remote from a home address in an exemplary embodiment.

In FIG. 6, control system 204 queries mobile network 110 to identify a location of mobile device 130 in step 602. In step 604, control system 204 identifies a location of vehicle 150 based on the location of mobile device 130 (because mobile device 130 is embedded within vehicle 150). In step 606, control system 204 compares the location of vehicle 150 with the home address to determine whether they are distant or separated by a threshold. For example, the threshold may be 100 feet, 200 feet, a half mile, a mile, or some other configurable distance. If the location of vehicle 150 is distant from the home address by the threshold, then control system 204 determines that vehicle 150 is remote from the home address in step 608. In other words, there is a high likelihood that vehicle 150 is being operated on public roadways without insurance instead of merely being stored at home. If the location of vehicle 150 is not distant from the home address by the threshold, then control system 204 determines that vehicle 150 is located at the home address in step 610. In other words, it is assumed that vehicle 150 is parked at home and not being operated on public roadways without insurance.

In FIG. 5, control system 204 sends the notification message to law enforcement entity 140 (see step 306 of FIG. 3) responsive to the determination that vehicle 150 is remote from the home address. If the determination is that mobile device 130 is not remote from the home address and is proximate to the home address, then control system 204 does not send the notification message (see step 306 of FIG. 3) to law enforcement entity 140 and continues to monitor the location of mobile device 130 (see step 504 in FIG. 5).

Insurance monitoring system 120 may also be able to control vehicle 150 through mobile device 130. For example, if control system 204 determines that vehicle 150 is uninsured, then control system 204 may generate a vehicle control message instructing mobile device 130 to disable vehicle 150, and network interface 202 sends the vehicle control message to mobile device 130 over mobile network 110. The vehicle control message may instruct mobile device 130 to turn off the engine in vehicle 150, to slow and stop vehicle 150, or otherwise control the movement or operation of vehicle 150. Thus, vehicle 150 may be disabled in some manner so that law enforcement can more easily locate it.

Insurance monitoring system 120 advantageously provides a network-based service for identifying uninsured vehicles. The service advantageously assists law enforcement in getting the uninsured vehicles off of the roadways.

Example

Figure 7:
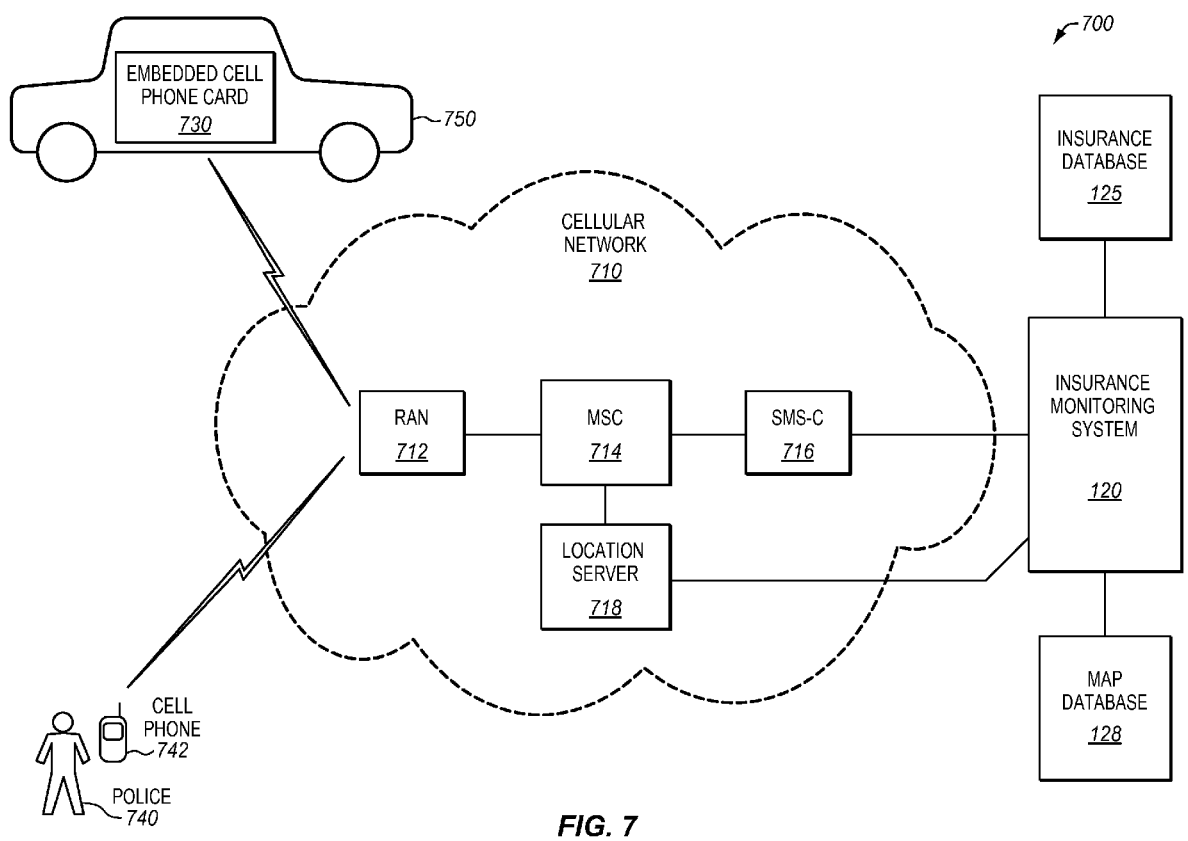
FIG. 7 illustrates another communication network in an exemplary embodiment.

FIG. 7 illustrates another communication network 700 in an exemplary embodiment. Communication network 700 includes a cellular network 710 operable to provide mobile communications to cell phone card 730 and cell phone 742. Cellular network 710 includes a RAN 712, a Mobile Switching Center (MSC) 714, a Short Message Service Center (SMSC) 716, and a location server 718. Communication network 700 further includes insurance monitoring system 120, insurance database 125, and map database 128.

Assume for this example that a vehicle 750 has an embedded cell phone card 730 that is able to communicate with cellular network 710. Cell phone card 730 may comprise a SIM card connected to a cellular transceiver, which is able to communicate with cellular network 710. Cell phone card 730 is embedded in such a manner that it cannot be easily disconnected by the owner of vehicle 750. Cell phone card 730 is also programmed with information specific to vehicle 750, such as a VIN, a license plate number, year, color, make, model, etc.

Figure 8:
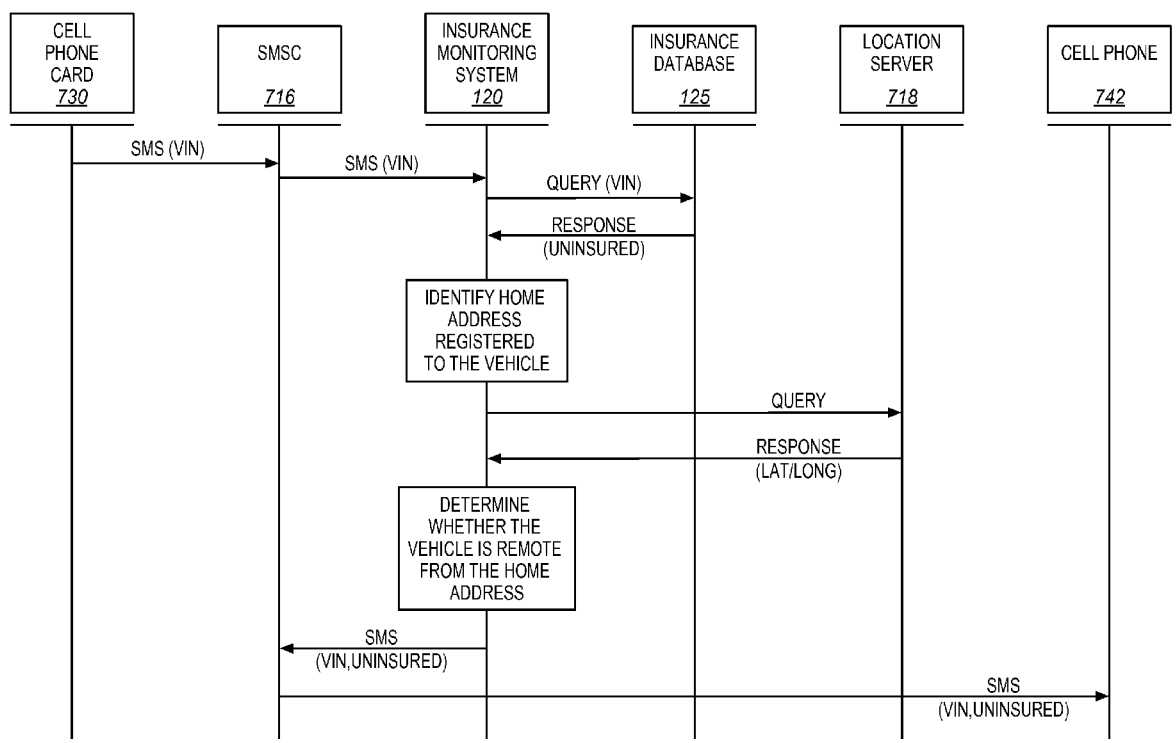
FIG. 8 is a message diagram that illustrates a process for identifying that a vehicle is uninsured in an exemplary embodiment.

FIG. 8 is a message diagram that illustrates a process for identifying that vehicle 750 is uninsured in an exemplary embodiment. When the user of vehicle 750 starts the engine, cell phone card 730 is programmed to send an SMS message to insurance monitoring system 120 over cellular network 710. The SMS message includes a vehicle identification, such as the VIN, the license plate number, etc. SMSC 716 receives the SMS message destined for insurance monitoring system 120, and stores the SMS message. SMSC 716 then forwards the SMS message to insurance monitoring system 120 according to SMS protocol.

In response to receiving the SMS message, insurance monitoring system 120 transmits a query to insurance database 125 to determine whether vehicle 750 is uninsured. The query includes the VIN and/or license plate number for vehicle 750. Insurance database 125 then searches for a match for the VIN and/or license plate number. Vehicle 750 is uninsured in this example, so insurance database 750 will find a record for vehicle 750 indicating that vehicle 750 is uninsured. Thus, insurance database 125 sends a response to insurance monitoring system 120 indicating that vehicle 750 is uninsured.

With vehicle 750 being uninsured, insurance monitoring system 120 next determines whether or not vehicle 750 is located at home before notifying police 740. To do so, insurance monitoring system 120 identifies a home address registered to vehicle 750. Insurance monitoring system 120 may send another query to insurance database 125 requesting the home address registered for vehicle 750. Insurance monitoring system 120 may alternatively query different databases not shown in FIG. 7, such as a Department of Motor Vehicle (DMV) database to acquire the home address registered for vehicle 750.

After identifying the home address registered for vehicle 750, insurance monitoring system 120 determines whether vehicle 750 is remote from this home address. If vehicle 750 is remote from the home address, there is a high likelihood that vehicle 750 is being operated on a public roadway without the proper insurance. Thus, insurance monitoring system 120 queries location server 718 for the present location of cell phone card 730. The query may include a directory number for cell phone card 730 or some other identifier. Location server 718 is able to determine the present location of cell phone card 730 in a variety of ways. For example, location server 718 may comprise a Gateway Mobile Location Center (GMLC) in a GSM/UMTS network. Location server 718 may alternatively comprise a Mobile Positioning Center (MPC) in a CDMA network. In response to the query, location server 718 identifies the location of cell phone card 730, and responds to insurance monitoring system 120 with the location (e.g., latitude/longitude).

Insurance monitoring system 120 then identifies a location of vehicle 750 based on the location of cell phone card 730, and compares the location of vehicle 750 with the home address registered for vehicle 750. If they are distant by a threshold (e.g., 100 feet), then insurance monitoring system 120 determines that vehicle is remote from the home address. Insurance monitoring system 120 then sends an SMS message to cell phone 742 of police officer 740. The SMS message includes the VIN and/or license plate number of vehicle 750, a description of vehicle 750, a map indicating the location of vehicle 750, etc. Police officer 740 thus has a description of vehicle 750 and a present location of vehicle 750. This gives police officer 740 a good opportunity to locate vehicle 750 and take the appropriate action.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An insurance monitoring system comprising:
   a network interface operable to receive a message over a mobile network from a mobile device embedded in a vehicle, wherein the message from the mobile device includes a vehicle identification for the vehicle; and
   a control system operable to query an insurance database based on the vehicle identification to determine whether the vehicle is uninsured, and to send a notification message to a law enforcement entity responsive to a determination that the vehicle is uninsured.

2. The insurance monitoring system of claim 1 wherein:
   the control system is further operable to query the mobile network for a location of the mobile device, to query a map database based on the location of the mobile device to identify a map corresponding with the location of the mobile device, and to include the map in the notification message sent to the law enforcement entity.

3. The insurance monitoring system of claim 1 wherein:
   the control system is further operable to identify a home address registered for the vehicle, to determine whether the vehicle is remote from the home address, and to send the notification message to the law enforcement entity responsive to a determination that the vehicle is remote from the home address.

4. The insurance monitoring system of claim 3 wherein:
   the control system is further operable to query the mobile network for a location of the mobile device, to identify a location of the vehicle based on the location of the mobile device, to compare the location of the vehicle with the home address, and to determine that the vehicle is remote from the home address if the location of the vehicle is distant from the home address by a threshold.

5. The insurance monitoring system of claim 1 wherein:
   the control system is further operable to generate a vehicle control message instructing the mobile device to disable the vehicle; and
   the network interface is further operable to send the vehicle control message to the mobile device over the mobile network.

6. The insurance monitoring system of claim 1 wherein:
   the control system is further operable to send the notification message to the law enforcement entity in a Short Message Service (SMS) message.

7. The insurance monitoring system of claim 1 wherein:
   the control system is further operable to send the notification message to the law enforcement entity in an email message.

8. The insurance monitoring system of claim 1 wherein:
   the control system is further operable to send the notification message to the law enforcement entity in an Instant Message (IM).

9. A method of insurance monitoring, the method comprising:
   receiving a message over a mobile network from a mobile device embedded in a vehicle, wherein the message from the mobile device includes a vehicle identification for the vehicle;
   querying an insurance database based on the vehicle identification to determine whether the vehicle is uninsured; and
   sending a notification message to a law enforcement entity responsive to a determination by a controller that the vehicle is uninsured.

10. The method of claim 9 further comprising:
    querying the mobile network for a location of the mobile device;
    querying a map database based on the location of the mobile device to identify a map corresponding with the location of the mobile device; and
    including the map in the notification message sent to the law enforcement entity.

11. The method of claim 9 further comprising:
    identifying a home address registered for the vehicle;
    determining whether the vehicle is remote from the home address; and
    sending the notification message to the law enforcement entity responsive to a determination that the vehicle is remote from the home address.

12. The method of claim 11 wherein determining whether the vehicle is remote from the home address comprises:
    querying the mobile network for a location of the mobile device;
    identifying a location of the vehicle based on the location of the mobile device;
    comparing the location of the vehicle with the home address; and
    determining that the vehicle is remote from the home address if the location of the vehicle is distant from the home address by a threshold.

13. The method of claim 9 further comprising:
    generating a vehicle control message instructing the mobile device to disable the vehicle; and
    sending the vehicle control message to the mobile device over the mobile network.

14. The method of claim 9 wherein sending a notification message to a law enforcement entity comprises:
    sending the notification message to the law enforcement entity in a Short Message Service (SMS) message.

15. The method of claim 9 wherein sending a notification message to a law enforcement entity comprises:
    sending the notification message to the law enforcement entity in an email message.

16. The method of claim 9 wherein sending a notification message to a law enforcement entity comprises:
    sending the notification message to the law enforcement entity in an Instant Message (IM).

17. An insurance monitoring system comprising:

a network interface operable to receive a message over a mobile network from a mobile device embedded in a vehicle, wherein the message from the mobile device includes a vehicle identification for the vehicle; and a control system operable to query an insurance database based on the vehicle identification to determine whether the vehicle is uninsured, to identify a home address registered for the vehicle, to determine whether the vehicle is remote from the home address, and to send a notification message to a law enforcement entity responsive to a determination that the vehicle is uninsured and that the vehicle is remote from the home address.

18. The insurance monitoring system of claim 17 wherein:
the control system is further operable to query the mobile network for a location of the mobile device, to identify a location of the vehicle based on the location of the mobile device, to compare the location of the vehicle with the home address, and to determine that the vehicle is remote from the home address if the location of the vehicle is distant from the home address by a threshold.

19. The insurance monitoring system of claim 17 wherein:
the control system is further operable to query the mobile network for a location of the mobile device, to query a map database based on the location of the mobile device to identify a map corresponding with the location of the mobile device, and to include the map in the notification message sent to the law enforcement entity.

20. The insurance monitoring system of claim 17 wherein:
the control system is further operable to generate a vehicle control message instructing the mobile device to disable the vehicle; and the network interface is further operable to send the vehicle control message to the mobile device over the mobile network.

* * * * *